(12) United States Patent
Frese et al.

(10) Patent No.: US 6,378,842 B1
(45) Date of Patent: Apr. 30, 2002

(54) V-BALL CONTROL VALVE

(75) Inventors: John J. Frese, Katy; James N. Reed, Spring, both of TX (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 09/620,478

(22) Filed: Jul. 20, 2000

(51) Int. Cl.[7] ................................................. F16K 1/16
(52) U.S. Cl. .............. 251/298; 251/315.16; 251/315.12
(58) Field of Search ........................... 251/298, 315.07, 251/315.12, 315.16, 316, 317

(56) References Cited

U.S. PATENT DOCUMENTS

| | | | |
|---|---|---|---|
| 2,885,179 A | * 5/1959 | Hartmann | 251/315.12 X |
| 3,379,408 A | * 4/1968 | Lowrey | 251/298 |
| 3,479,006 A | * 11/1969 | Brown | 251/316 X |
| 3,514,076 A | * 5/1970 | Wheatley | 251/298 X |
| 3,576,309 A | * 4/1971 | Zawacki | 251/315.12 X |
| 3,997,142 A | * 12/1976 | Broadway | 251/317 X |
| 4,137,935 A | * 2/1979 | Snowdon | 251/298 X |
| 4,193,578 A | 3/1980 | Brumm | |
| 4,256,285 A | 3/1981 | Davidson | |
| 4,257,576 A | * 3/1981 | Legris | 251/315.16 X |
| 4,519,579 A | * 5/1985 | Brestel et al. | 251/298 X |
| 4,697,786 A | * 10/1987 | Kennedy | 251/317 X |
| 4,822,000 A | * 4/1989 | Bramblet | 251/298 |
| 4,911,413 A | 3/1990 | Baba et al. | |
| 5,016,857 A | 5/1991 | Bovee et al. | |
| 5,170,992 A | 12/1992 | Lenberg | |
| 5,588,638 A | 12/1996 | Bunting et al. | |
| 5,618,026 A | 4/1997 | Geyer | |
| 5,755,427 A | 5/1998 | Koskinas | |
| 5,820,103 A | * 10/1998 | Nilsson et al. | 251/315.16 X |

OTHER PUBLICATIONS

Brochure of Norriseal Series 2700A, 2700E, & 2720 Control Valve (1997), p. 2.
Pages from Fischer Brochure for Design V200 Rotary Control Valve, May 1994, Bulletin 51, 3:V200.
Page from a Valtek Brochure for ShearStream Control Valves.
Pp. 10 and 11 from an Orbit Brochure.
Page from ITT Engineered Valve Products brochure.

* cited by examiner

Primary Examiner—Henry C. Yuen
Assistant Examiner—John Bastianelli
(74) Attorney, Agent, or Firm—Fellers, Snider, Blankenship, Bailey & Tippens, P.C.

(57) ABSTRACT

A V-ball-type control valve having: a valve body installable in a piping system; a V-ball-type valve element rotatably positioned in the valve body; a valve shaft extending from the V-ball-valve element; and a bonnet removably attachable to the valve body. The valve shaft is rotatably positionable through the bonnet such that the bonnet, the valve shaft, and the valve ball element can all be removed from the valve body without removing the valve body from the piping system.

9 Claims, 4 Drawing Sheets

V-BALL CONTROL VALVE

FIELD OF THE INVENTION

The present invention relates to rotary motion V-ball-type control valves.

BACKGROUND OF THE INVENTION

Rotary motion V-ball-type control valves are commonly employed in applications where it is necessary to maintain efficient control over operational flows ranging from very low to very high. In this regard, V-ball-type control valves provide a high degree of rangeability. Rangeability is defined as the ratio between the maximum and minimum controllable flow rates provided by the valve. The rangeability of a rotary motion V-ball control valve will typically be in the neighborhood of about 300:1. In contrast, the rangeability of a linear motion plug-type control valve will typically be in the neighborhood of only about 50:1.

A rotary motion V-ball control valve of the type heretofore known in the art will commonly comprise: a valve body having flanges or other suitable structures provided at the inlet and outlet ends thereof for installing the valve body in a piping system; a V-type valve ball element rotatably positioned in the valve body; and an operating shaft secured to the V-ball element and rotatably extending laterally through the wall (typically the side wall) of the valve body. The control valve can be employed to automatically regulate fluid flow rates, regulate fluid pressures, maintain vessel liquid levels, or control other flow-related operations. The control valve is typically operated by connecting a rotary motion actuator to the exterior end of the operating shaft. Such rotary motion actuators are commonly either pneumatically or electrically operated.

The name "V-ball" refers to a V-shaped contour provided in the leading edge of the rotatable valve ball element. This feature contributes greatly to the ability of the valve to provide effective control even at very low flow rates (i.e., when the valve is very near its closed position).

Unfortunately, rotary motion V-ball-type control valves have heretofore had one significant shortcoming. In contrast to most top entry, linear motion plug-type valves, the interior components of V-ball. control valves have not been accessible for inspection, maintenance, or replacement without removing the valve body from the piping system. Thus, although initially less expensive than linear motion valves to purchase, V-ball control valves can be more difficult and costly to maintain and repair.

SUMMARY OF THE INVENTION

The present invention provides an improved rotary motion V-ball-type control valve which satisfies the needs and alleviates the problems discussed hereinabove. The inventive valve includes: a valve body installable in a piping system; a V-ball-type valve element rotatably positioned in the valve body; and a valve shaft extending from the valve ball element. The improvement of the present invention comprises a bonnet removably attached to the valve body such that the valve shaft is rotatably positioned through the bonnet. The improvement further comprises the bonnet, the valve shaft, and the valve ball element all being removable from the valve body while the valve body is installed in the piping system.

Further objects, features, and advantages of the present invention will be apparent to those skilled in the art upon examining the accompanying drawings and upon reading the following description of the preferred embodiments.

DETAILED DESCRIPTION OF THE PREFERRED EMBODIMENTS

Figure 1:
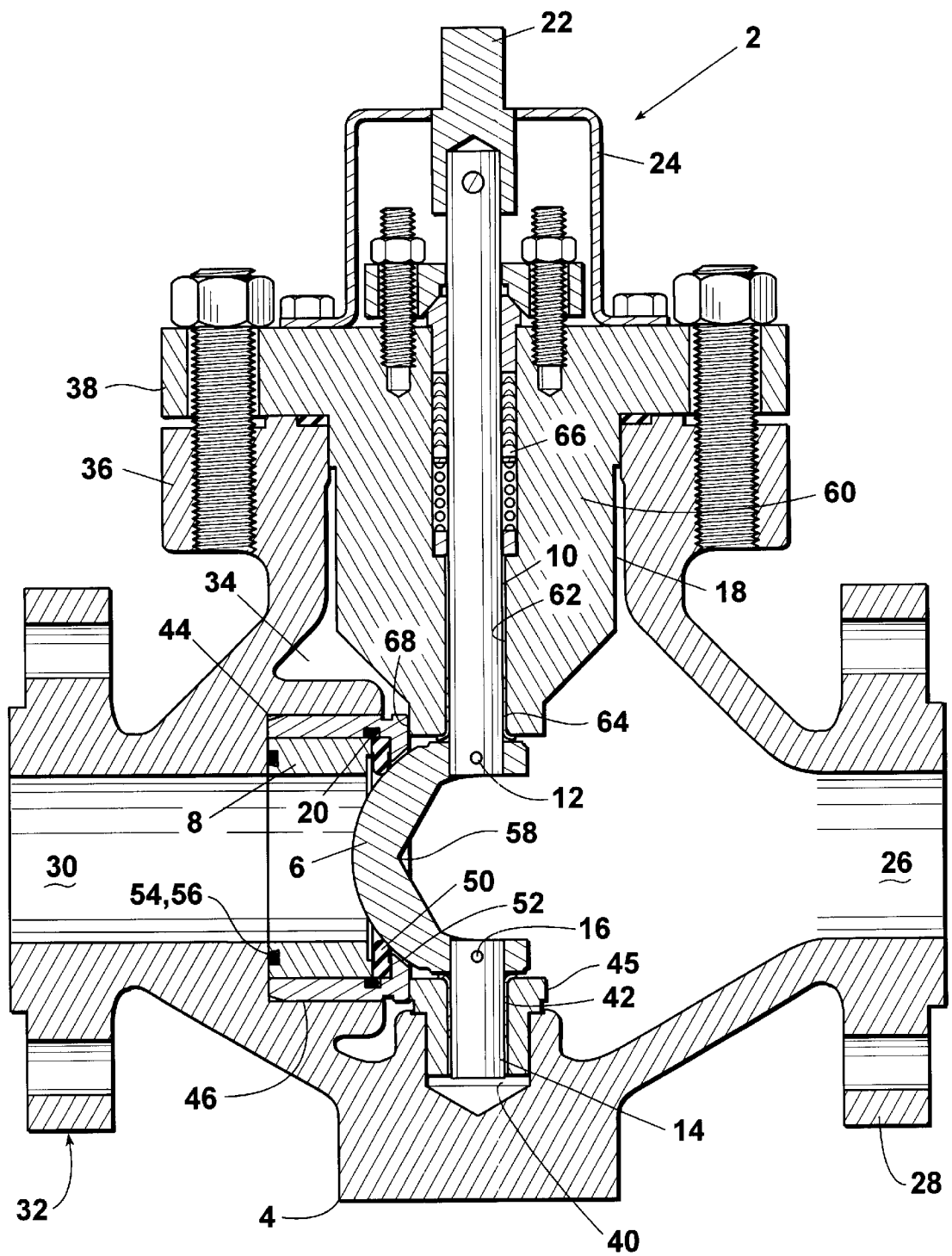
FIG. 1 provides a cutaway elevational side view of an embodiment 2 of the V-ball-type control valve of the present invention.
Figure 2:
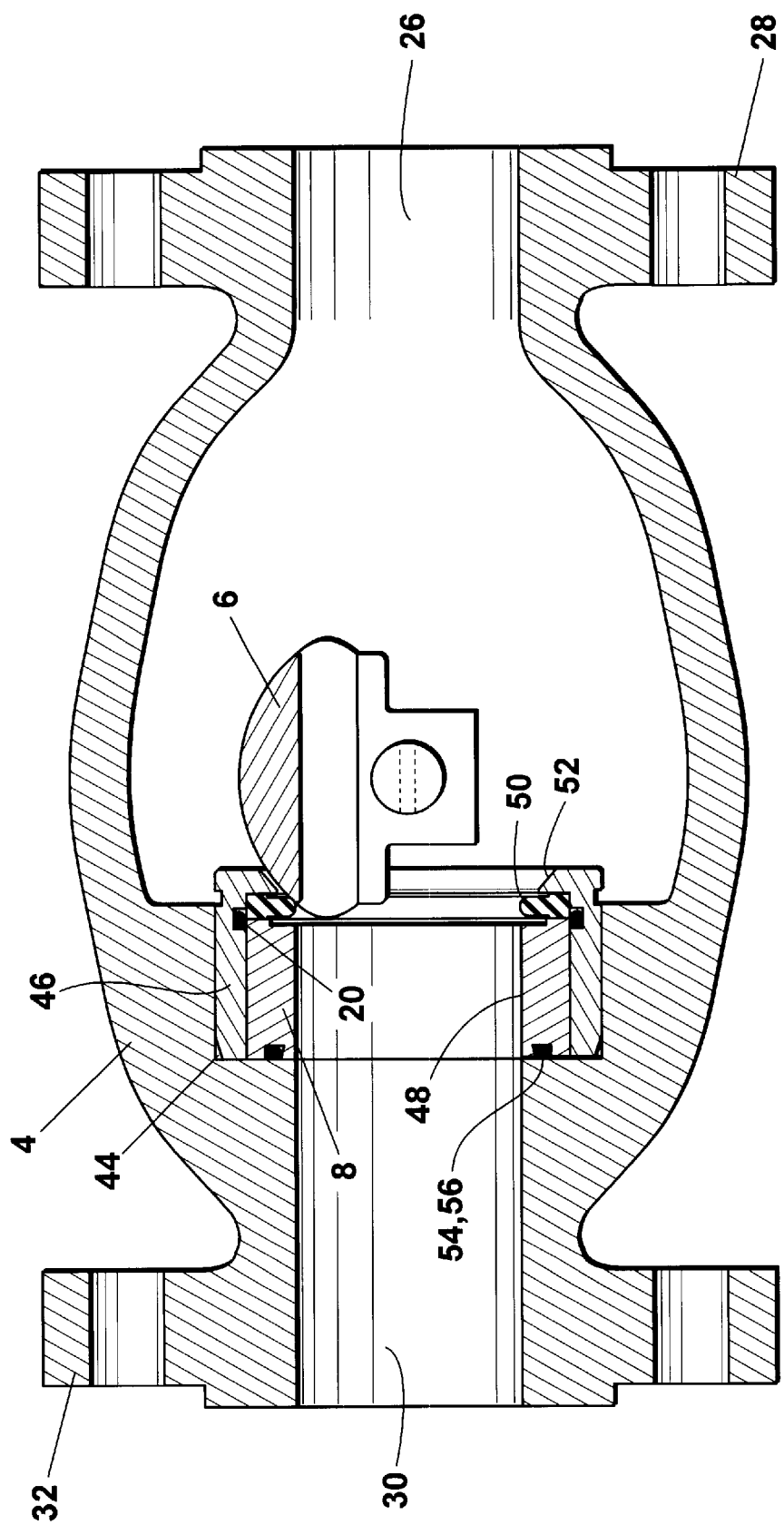
FIG. 2 provides a cutaway top view of inventive valve 2.
Figure 3:
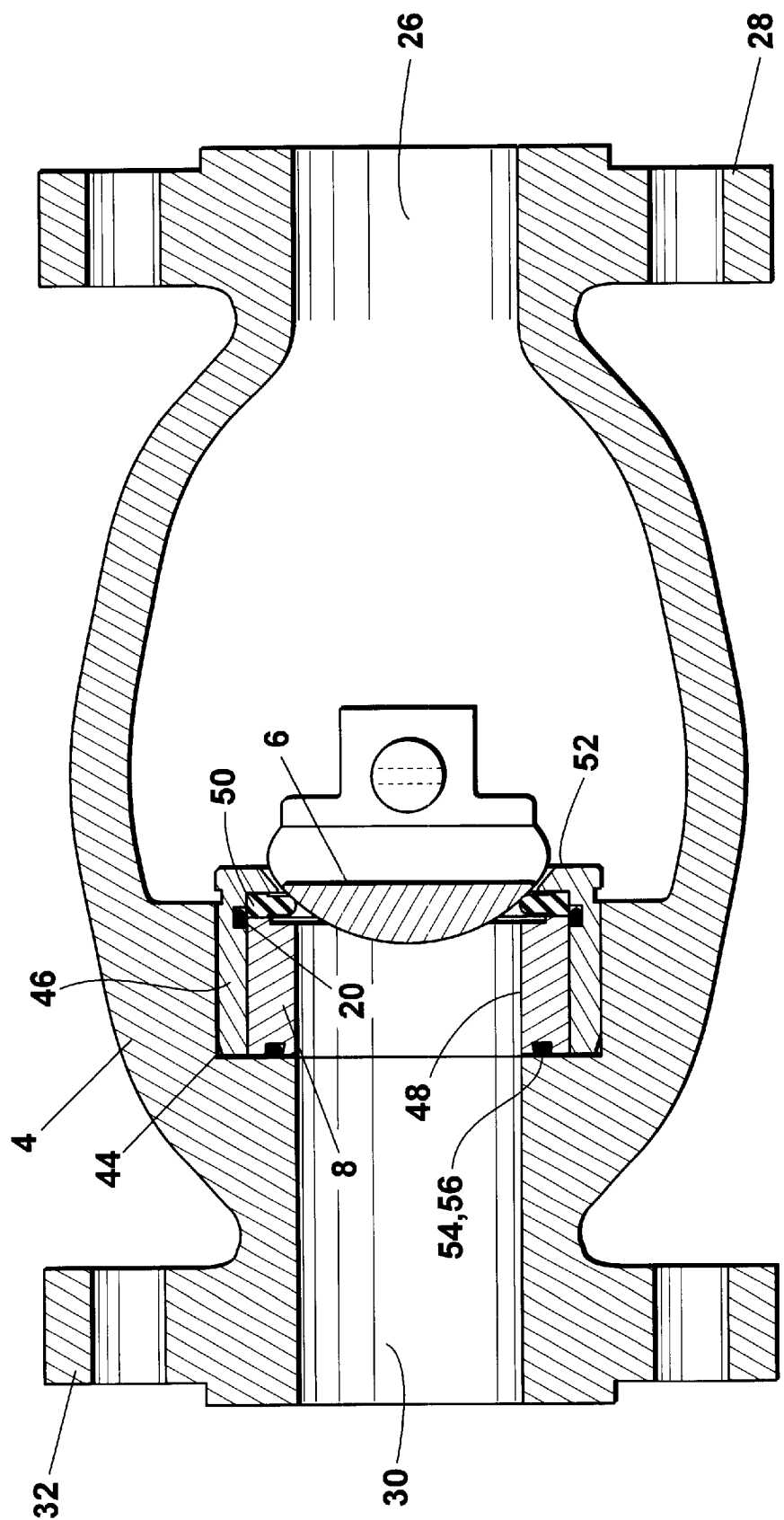
FIG. 3 provides a cutaway top section view of inventive valve 2.

An embodiment 2 of the inventive rotary motion V-ball control valve is depicted in FIGS. 1–3. Inventive valve 2 comprises: a valve body 4; a V-type valve ball element 6 rotatably positioned in valve body 4; a valve seat assembly 8 removably positioned in valve body 4; an operating shaft 10 secured to ball element 6 by a shaft pin 12; a lower shaft 14 secured to ball element 6 by a shaft pin 16; a bonnet 18 removably secured to the top of valve body 4 and through which operating shaft 10 is rotatably received; an actuator adaptor 22 received on the distal end of operating shaft 10 for linking operating shaft 10 with a rotary motion actuator; and an actuator bracket 24 attached to bonnet 18.

As will be apparent to those skilled in the art, the valve body 4 and bonnet 18 employed in embodiment 2 of the inventive V-ball control valve are similar to the valve body and bonnet structures employed in certain top entry, linear motion plug-type control valves. In contrast to these linear motion-type valves, bonnet 18 is inverted from its usual configuration, such that it projects downwardly into valve body 4. However, it will be understood that other valve body structures could be employed in the inventive device. Moreover, as used herein and in the claims, the "bonnet" employed in the present invention could be a plate, an inverted bonnet-type structure projecting into the valve body, a non-inverted bonnet-type structure projecting away from the valve body, or generally any other structure capable of retaining shaft 10 for rotational movement while being detachable from the valve body to allow maintenance, removal, and replacement of the interior components of the inventive valve.

In embodiment 2 of the inventive control valve, valve body 4 comprises: an inlet flow passage 30; an inlet flange 32; an outlet flow passage 26; an outlet flange 28; a top chamber 34 wherein the inverted bonnet 18 is received; a top flange 36 to which a corresponding flange 38 on inverted bonnet 18 is secured; a lower interior bore 40 in which lower shaft 14 of the ball element assembly is received; a bushing 42 and bushing/seat holder 45 provided in lower interior bore 40 for rotatably retaining lower shaft 14; and an enlarged interior. bore or other cavity 44, provided in inlet flow passage 30 for receiving valve seat assembly 8. Inlet and outlet flanges 32 and 28 are used for bolting or otherwise securing valve body 4 between a corresponding pair of flanges provided in the piping system (not shown).

Valve seat assembly 8 comprises: a seal retainer 46 which is removably received in the interior cavity 44 of valve body 4; a seal spacer 48 held within seal retainer 46; a seal element 50 clamped between the leading end of spacer 48 and a tapered radial lip 52 provided on the leading end of seal retainer 46; an O-ring 54 or other sealing element held in a groove 56 formed in the trailing end of spacer 48; and an O-ring 20 or other sealing element, held in a groove formed in the interior wall of seal retainer 46, for sealing retainer 46, spacer 48 and sealing element 50. As will be understood by those skilled in the art, valve seat assembly 8 retains sealing element 50 in operative contact with valve ball element 6 such that no flow or leakage will occur when the valve is closed.

Figure 4:
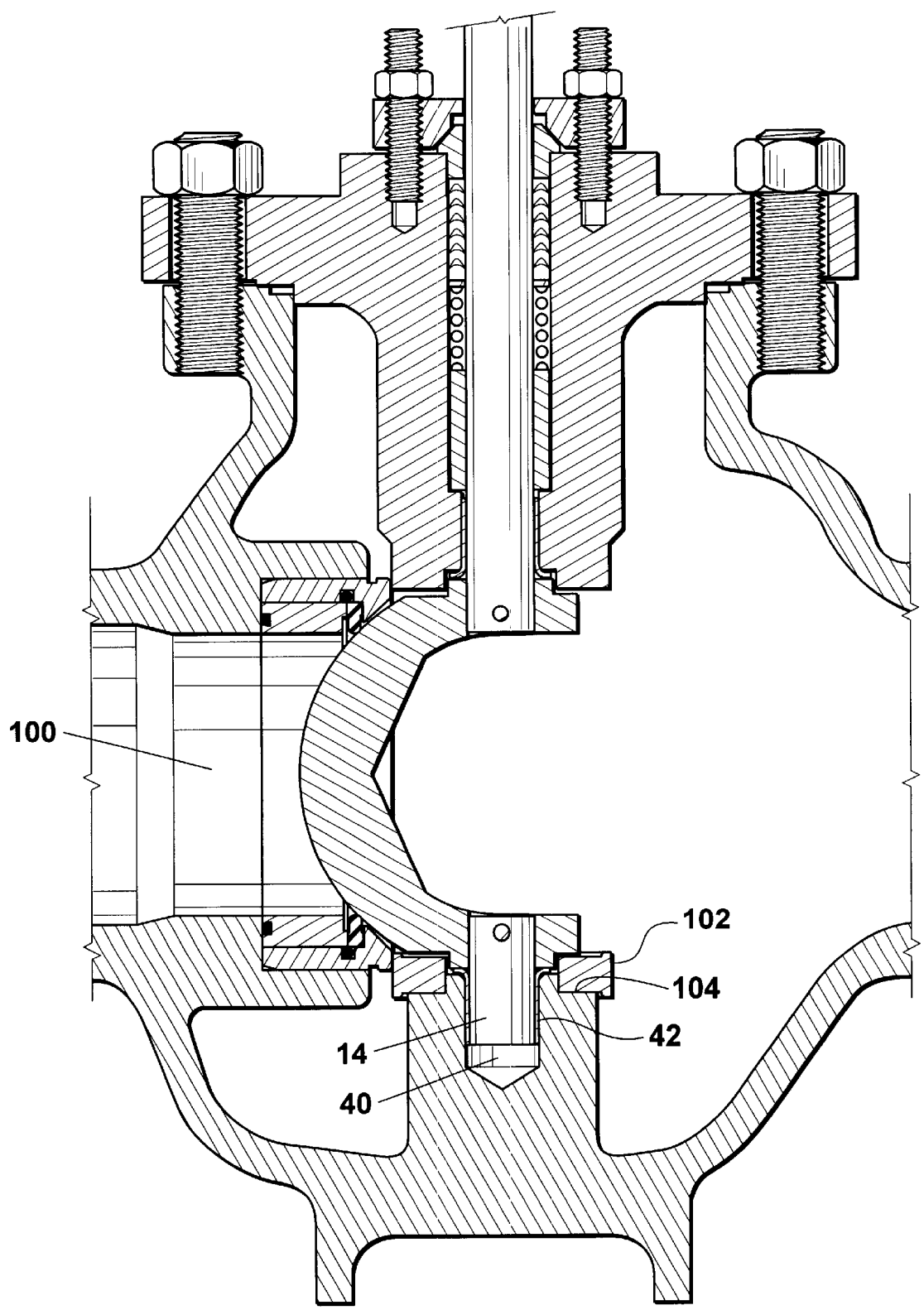
FIG. 4 provides a cutaway elevational side view of an alternative embodiment 100 of the inventive valve.

As seen in FIG. 1, the seat assembly 8 is preferably retained in cavity 44 by abutment with the lower end 68 of bonnet 18 and with the upper portion of bushing/seat holder 45. Thus, the seat assembly 8 can be easily removed for maintenance by simply withdrawing bonnet 18 and bushing/seat holder 45. Alternatively, as will be understood by those skilled in the art, seal retainer 46 could be threadedly held in cavity 44 or other structures could be employed for removably retaining seat assembly 8. One particularly preferred alternative embodiment 100 is depicted in FIG. 4. Rather than using a holder 45 for holding both the lower shaft bushing 42 and the seat assembly 8, the lower bore 40 of embodiment 100 is sized to directly receive bushing 42 and seat assembly 8 is held in cavity 44 by a removable ring 102 which abuts the forward end of seal retainer 46. Ring 102 is preferably positioned around lower shaft 14 on a radial shoulder 104 formed in the interior of body 4.

As will also be understood by those skilled in the art, valve ball element 6 can be generally any V-type valve ball element heretofore known in the art. The ball element will preferably have a V-shaped contour 58 provided in at least the leading edge thereof. The particular valve ball element 6 employed in embodiment 2 of the inventive valve preferably has V-shaped contours 58 formed in both its leading and trailing edges.

As noted above, the particular bonnet 18 employed in embodiment 2 of the inventive control valve has a structure which is the same as or similar to that of a bonnet of a type commonly employed in top entry, linear motion control valves. However, rather than projecting upwardly from the top of valve body 4 as would typically be the case for a linear motion valve, bonnet 18 is inverted such that the body 60 thereof is received in the upper chamber 34 of valve body 4. Inverted bonnet 18 has a vertical passage, 62 provided therethrough for rotatably receiving operating shaft 10. As will be understood by those skilled in the art, vertical passage 62 preferably includes a spring-loaded packing assembly 66 and a bushing 64 for holding and facilitating the rotational movement of operating shaft 10.

As will be apparent, bonnet 18, operating shaft 10, valve ball element 6, and seal assembly 8 can all be removed, maintained, and/or replaced through the top of valve body 4. Thus, essentially all of the internal structures and components of inventive V-ball control valve 2 can be maintained, repaired, and/or replaced without disconnecting the inlet and outlet flanges 32 and 28 of valve body 4 from the piping system.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A V-ball control valve comprising:

a valve body;

a V-ball valve element having a V-shaped contour therein rotatably positionable in said valve body;

a valve shaft extending from said V-ball valve element;

a valve ball seat assembly having a sealing element and being positionable in said valve body such that said sealing element will seal against said V-ball valve element; and a bonnet removably extendable into said valve body such that said valve shaft is rotatably positioned in said bonnet and said bonnet contacts said valve ball seat assembly for holding said valve ball seat assembly in said valve body.

2. The V-ball control valve of claim 1 wherein said valve body is installable in a piping system and wherein said bonnet, said valve shaft, said V-ball valve element, and said valve ball seat assembly are removable from said valve body while said valve body is installed in said piping system.

3. The V-ball control valve of claim 1 wherein said valve body has a top and said bonnet is removably attachable to said top of said valve body.

4. The V-ball control valve of claim 1 wherein:

said valve body has an inlet flow passage;

said valve ball seat assembly removably extends into said inlet flow passage; and said bonnet contacts said valve ball seat assembly in a manner effective for holding said valve ball seat assembly in said inlet flow passage.

5. The V-ball control valve of claim 4 further comprising:

a second shaft extending from said V-ball valve element opposite said valve shaft and holding means, positionable around said second shaft, for assisting said bonnet in holding said valve ball seat assembly in said inlet flow passage.

6. The V-ball control valve of claim 5 wherein said holding means is a ring positionable around said second shaft for contacting said valve ball seat assembly.

7. A V-ball control valve comprising:

a valve body having an inlet flow passage;

a V-ball valve element rotatably positionable in said valve body and having at least one V-shaped contour therein;

at least one shaft extending from said V-ball valve element;

a valve ball seat assembly having a sealing element and being removably positionable in said valve body such that said valve ball seat assembly extends into said inlet flow passage; and holding means, other than said V-ball valve element, for holding said valve ball seat assembly in said inlet flow passage.

8. The V-ball control valve of claim 7 wherein said valve body is installable in a piping system and wherein said V-ball valve element, said valve ball seat assembly, and said shaft are removable from said valve body while said valve body is installed in said piping system.

9. The V-ball control valve of claim 7 wherein said holding means is a contacting structure positionable in said valve body around said shaft for contacting said valve ball seat assembly.

* * * * *